Aug. 9, 1949.　　　　J. BUONINCONTRI　　　　2,478,742
ELECTRIC CURRENT METER
Filed July 15, 1944　　　　　　　　　　　　　2 Sheets-Sheet 1
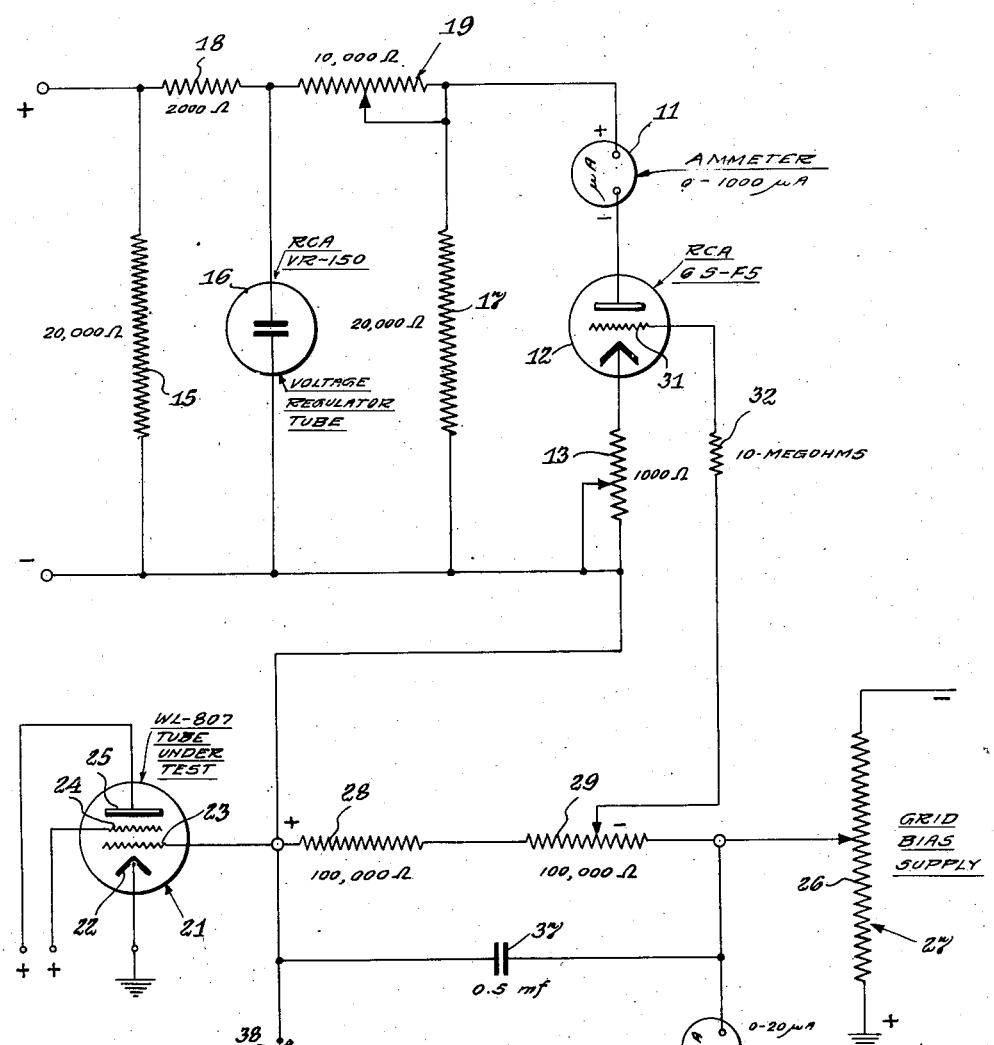
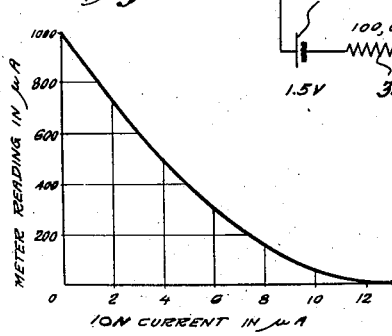
INVENTOR
J. BUONINCONTRI
BY
ATTORNEY

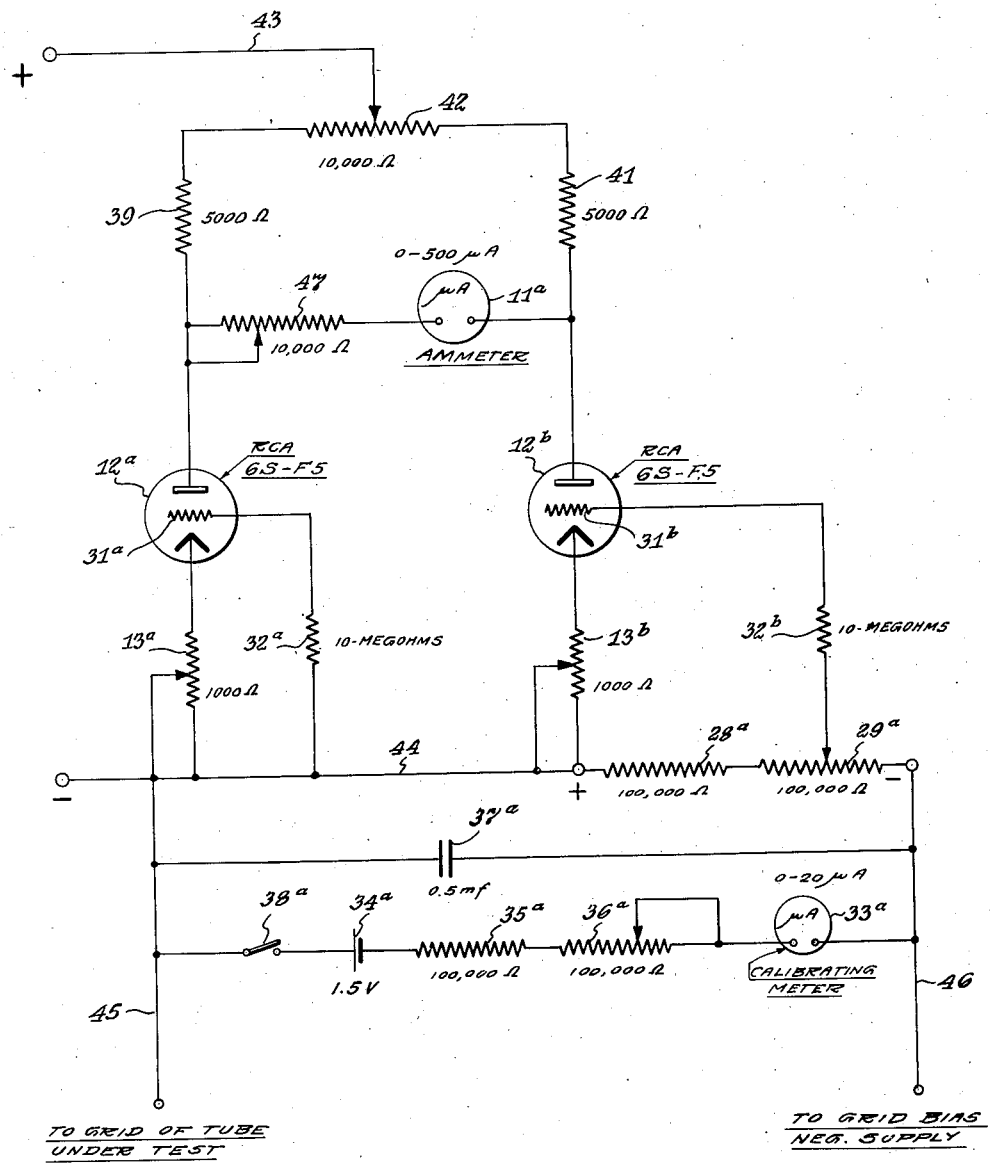

Patented Aug. 9, 1949

2,478,742

UNITED STATES PATENT OFFICE 2,478,742

ELECTRIC CURRENT METER

Joseph Buonincontri, Irvington, N. J., assignor to Westinghouse Electric Corporation, East Pittsburgh, Pa., a corporation of Pennsylvania Application July 15, 1944, Serial No. 545,052

3 Claims. (Cl. 315—368)

This invention relates to meters for electric current and more particularly to one for measuring every weak current, with an arrangement to prevent meter damage due to an increase in said current beyond safe limits.

The principal object of my invention, generally considered, is to provide an electric current meter in which either the pointer reads lower as the current being measured increases, or the meter is in a bridge circuit, whereby automatic protection against overload is assured.

Another object of my invention is to provide apparatus for measuring the positive ion current to the grids of electronic devices or radio tubes undergoing test, in such a way that the amount of such current, or the corresponding gas pressure as showing the condition of such devices, is clearly indicated without danger to the measuring instrument or microammeter in case of excessive current or short circuit.

A further object of my invention is to provide means for protecting a microammeter against excessive current by biasing the grid of a three-electrode tube in series therewith more and more as the current being measured increases, so that said meter gives a decreasing reading as the current being measured increases, until it reads zero at the end of its range.

Other objects and advantages of the invention, relating to the particular arrangement and construction of the various parts, will become apparent as the description proceeds.

Referring to the drawing:

Figure 1 is a wiring diagram showing one embodiment of my invention,

Figure 2 is a chart showing how the readings of the microammeter are interpreted to show the flow of gas or positive ion current through a radio tube being tested, which current is also a measure of the pressure of the gas in said tube, Figure 3 is a wiring diagram showing another embodiment of my invention.

In the measurement of the current, conducted by the gas as positive ion current, collected by the grids of vacuum tubes, as manufactured and tested by the assignee of the present application, a microammeter usually having a range from 0 to 50 microamperes, direct current, is used. If a short circuit develops in the tube between the grid and some other element, or if the current conducted by the gas in the tube is high, the meter is subjected to an overload. If the overload is severe, or over 50 microamperes or otherwise beyond the safe load on the meter, the latter will burn out. It will also be understood that there are no relays operating in the microampere range which could be used to protect such a meter. Under present conditions it takes many months to replace such a special range meter.

In accordance with my invention, I have developed a meter arrangement which will read weak current, such as that in a radio tube being tested, in such a manner that the higher the current the lower the indication given until a zero reading is reached, so that the meter is automatically protected if an overload occurs.

Referring to the drawing in detail, like parts being designated by like reference characters, and first considering the embodiment of Figs. 1 and 2, there is shown a microammeter 11 adapted to read from 0 to 1,000 microamperes. This is placed in series with a three-electrode tube 12, preferably of the 6S-F5 type as manufactured by the Radio Corporation of America, and in series with an adjusting resistance 13 of 1.000 ohms maximum capacity. These three elements are energized from a source of direct current, preferably of a potential of about 200 volts D. C., the magnitude of such voltage being closely regulated by some means such as a network such as that illustrated, including a preferably 20,000 ohm resistor 15, a voltage regulator tube 16 of the VR-150 type, as manufactured by the Radio Corporation of America, and another 20,000 ohm resistor 17, all across the line ahead of the devices 11, 12 and 13, said resistor 15 and regulating tube 16 being spaced by a preferably 2,000 ohm resistor 18 in one leg of the circuit. An adjustable preferably 10,000 ohm resistor 19 is desirably disposed in the same leg of the circuit to space the voltage regulator tube 16 from the resistor 17.

The tube undergoing test is represented at 21, the electron current therethrough passing from cathode 22 through control grid 23 and screen grid 24 to anode or plate 25, positive ions due to residual gas being picked up by the grid 23 which is kept at a negative potential. The grid 23 is desirably biased from an adjustable resistor 26 of a grid-bias supply 27, through a preferably 100,000 ohm resistor 28 and an adjustable resistor 29 of 100,000 ohms maximum capacity. The grid current through the resistors 28 and 29 is used to bias the grid 31 of the three-electrode tube 12, so as to make it increasingly negative as the positive ion or current, through the tube 21 under test, increases. This biasing circuit desirably includes a preferably ten megohm resistor 32.

In operation, electron and ion current will flow from the cathode 22 through the grids to the anode 25, a gas or positive ion part being collected by the grid 23 and developing a voltage across the biasing resistors 28 and 29. With a biasing resistance of 200,000 ohms, it is found that, in testing a tube of the WL-807 type as manufactured by the assignee of the present application, 4 microamperes of current will flow. This develops a .8 volt drop across the resistors 28 and 29. This voltage applied through the resistor 32 to the grid 31 of the vacuum tube 12, correspondingly reduces the current through the tube and the microammeter 11 in series therewith.

The vacuum-tube-meter circuit is calibrated and the tube 12 biased to permit 1,000 microamperes to flow in the plate circuit in the tube 12 and be read on the meter 11 when no positive ion current flows in the tube 21 under test. As soon as positive ion current flows through the biasing resistors 28 and 29, the voltage so developed will add a correspondingly more negative bias to the grid 31, and correspondingly reduce said plate current and the indication of the meter 11.

The meter arrangement is such that a biasing voltage change of an .8 volt will produce a change in the plate current from 1,000 microamperes to 500 microamperes. Therefore, the positive ion current of 4 microamperes is equivalent to a change of 500 microamperes on the proposed meter. A gas current of 13 microamperes or more will cut off the tube 12 completely, giving a zero reading on the meter 11. It is therefore impossible to burn out the meter if a short occurs or excessive current flows through the tube under test.

In calibrating the meter the following adjustments are made: With no current flowing through the biasing resistors 28 and 29, the drop across the adjusted portion of the resistor 13 in series with the tube 12 should be .75 volt. This, of course, means that the resistor 19 should be adjusted to give a plate current of 1,000 microamperes. If 1,000 microamperes cannot thus be obtained, the resistor 13 should be adjusted for such current, even if the voltage across it is made slightly different from that specified.

A microammeter 33 is then placed in the calibrating circuit across the biasing resistors 28 and 29, as by closing the switch 38. The microammeter 33 desirably has a range of from 0 to 20 microamperes. The circuit desirably includes a 1½ volt battery 34, a 100,000 ohm resistor 35 and an adjustable 100,000 ohm resistor 36, across a desirably .5 microfarad by-pass condenser 37. The resistor 36 is adjusted for the desired gas current specification limit, in the present example 4 microamperes. Then the resistor 29 is adjusted for a plate current of 500 microamperes on the meter 11, or the arbitrary limit for the test. The circuit is now calibrated and the switch 38 may be opened to cut out the calibrating equipment.

During use, the adjustable resistor 19 may be employed by the operator to set for full scale deflection of the meter 11 when no current flows through the tube 21 under test. The readings on the meter 11 are interpreted by reference to the chart of Fig. 2. For example, a meter reading of 640 microamperes means a current of 3 microamperes, and one of 200 microamperes means a gas current of 7.8 microamperes, as actual test readings.

It has been found in using the foregoing arrangement embodying my invention, that the stability of the circuit is good, as readings cannot be unbalanced by touching any of the parts of the calibrating circuit or any parts of the grid circuit of the tube under test, or by moving or touching any of the leads of the vacuum-tube-meter circuit. Drifting of the plate current due to changes in tube characteristics and effects of the weather on the components of the circuit is negligible, but any slight change can be allowed for by the operator adjusting the resistor 19. Such adjustment will not in any way affect the calibration of the meter.

The tube under test will be subjected to a grid bias more positive, by the .8 volt, than the grid bias supply for the tube, but this results in an increase of only one or two milliamperes in the plate circuit. This will not harm the tube, but for the measurement of the other characteristics the 200,000 ohm biasing grid resistors should be shorted out as by means of a relay.

I am enumerating several advantages of my invention, which does not mean that other advantages will not be discovered or apparent to those skilled in the art:

1. The standard type of D. C. meter having a range to 1 milliampere may be employed.
2. The circuit is not unbalanced or made unstable due to lead capacity or other capacitative affects.
3. Only one adjustment is required by the test operator and this will not affect the calibration.
4. The circuit is simple to calibrate and only two independent adjustments are required.
5. A plate to grid short circuit will not damage the vacuum tube of the meter circuit or the direct current 0 to 1 milliammeter 11. A plate to grid short will tend to bias the vacuum tube 12 to cut-off and the biasing resistors 28 and 29 will act as current-limiting devices and prevent any burn out.

Referring now to the embodiment of my invention illustrated in Fig. 3, there is shown a microammeter 11a adapted to read from 0 to 500 microamperes. It will be noted that, in the present embodiment, a microammeter with a smaller range is employed than in the preceding embodiment. This is because the present embodiment, while accomplishing the same purpose as the preceding embodiment, makes use of a bridge-type of circuit in which the meter 11a is in the bridging connection, thereby giving a reading which is much more sensitive than that of the preceding embodiment because it depends on a difference in potential between the parts of the bridge circuit which it connects. In this arrangement the meter will give a zero reading when no gas current flows and read up-scale as the flow of current increases, rather than down scale as in the preceding embodiment. The device will otherwise accomplish all the purposes of the original arrangement, although it is not as simple.

The bridge circuit referred to, includes two three-electrode tubes 12a and 12b, both preferably of the 6S-F5 type as manufactured by the Radio Corporation of America, and respectively in series with variable resistances 13a and 13b each of 1,000 ohms maximum capacity. These combinations respectively involve two legs of the bridge. The other legs of the bridge involve resistors 39 and 41, respectively connecting with the opposite ends of variable resistor 42, the adjusting element of which is connected to the positive terminal of a source of direct current, preferably one regulated as in the preceding embodiment, so that beyond the control resistors there is available a potential of about 150 volts, by lead 43. The legs of the bridge which include the tubes 12ª and 12ᵇ are correspondingly united by lead 44 and connected to the negative terminal of the source of direct current.

The arrangement illustrated is, as in the preceding embodiment, for the purpose of measuring the positive ion current or that to the control grid of a tube such, for example, as that designated 21 in the preceding embodiment. The line from the control grid of such a tube is designated by the reference character 45 and connects with the line 44. The grid, as in the preceding embodiment, is desirably biased as by means of an adjustable resistor (not shown) by lead 46 therefrom, through a preferably 100,000 ohm resistor 28ª and an adjustable resistor 29ª of 100,000 ohms maximum capacity. The current from the control grid, and which passes through the resistors 28ª and 29ª is used to bias the grid 31ᵇ of the three-electrode tube 12ᵇ so as to make it increasingly negative as the positive ion or gas current through the tube under test increases. This biasing circuit desirably includes a preferably 10 megohm resistor 32ᵇ. A corresponding resistor 32ª is in the circuit from line 44 to grid 31ª of tube 12ª.

In setting up the circuit initially, the resistor 47 in series with the meter 11ª is set for zero resistance. The resistors 13ª and 13ᵇ are both set for half their maximum resistances, that is, at 500 ohms each. The resistor 42 is set so that half of its resistance is in series with each of the resistances 39 and 41. If, with this set-up, the meter 11ª does not read zero, the resistors 13ª 13ᵇ, or both, are adjusted slightly until a zero reading is obtained. This means that the meter initially reads zero, that is, when no current flows.

In operation, electron and ion current will flow from the cathode of the tube under test, through the grids to the anode, a positive ion part being collected by the control grid and thereby developing a voltage across the biasing resistors 28ª and 29ª. With a biasing resistance of 200,000 ohms it will be seen that four microamperes of current develop a .8 volt drop across the resistors, as in the preceding embodiment. This voltage applied through the resistor 32ᵇ to the grid 31ᵇ of the vacuum tube 12ᵇ, correspondingly reduces the current through the tube, without affecting the current through the tube 12ª, thereby causing a difference in potential across the bridging circuit involving the meter 11ª and the resistor 47 in series therewith, so that the meter reads up scale as the bias on the grid 31ª increases with increasing current through the resistors 28ª and 29ª.

The meter is calibrated in a manner similar to that of the preceding embodiment. With no current flowing through the biasing resistors, the meter 11ª reads zero. The calibrating circuit, as in the preceding embodiment desirably includes a 1½ volt battery 34ª, a 100,000 ohm resistor 35ª and an adjustable 100,000 ohm resistor 36ª in series with a microammeter 33ª, desirably having a range of from 0 to 20 microamperes, said circuit being controlled by a switch 38ª and desirably having a .5 microfarad bypass condenser 37ª. In calibrating, the switch 38ª is closed and the resistor 36ª adjusted for a predetermined gas current flow, that is, preferably four microamperes. The resistor 47 is then adjusted so that the meter 11ª reads 250 microamperes, that is, half scale. This means that the meter 11ª is calibrated to show four microamperes of gas current when it reads 250 microamperes. Any reading over 250 microamperes indicates high positive ion current and a bad tube.

After the initial calibration has been made, the switch 38ª is opened and the arrangement is ready to measure positive ion current. The only adjustment thereafter required by the operator will be for tube drift which can be compensated for by an adjustment of the resistor 42 for zero indication on the meter 11ª when no current is flowing.

A chart corresponding to Fig. 2, but for the circuit of Fig. 3, can be prepared in a similar manner. It will however be noted that the curve of such a chart slopes in the opposite direction from that of Fig. 2, that is, the meter reading increases as the gas current increases. However, on account of the limited capacity of the tubes 12ª and 12ᵇ and the high resistances which have to be traversed by current prior to reaching the meter 11ª the latter is well protected against dangerous overloads or burn outs, even though the reading thereon increases as the current being measured increases within the limits of the arrangement. It will therefore be seen that the present embodiment, although providing an arrangement more complicated than that of the preceding embodiment, has two distinct advantages thereover, first, it gives an up-scale reading as the current being measured increases, which is a convenience and avoids possible confusion, and second, it uses a more sensitive meter than the arrangement of the first embodiment.

Although preferred embodiments of my invention have been disclosed, it will be understood that it is not limited to testing the gas current in vacuum devices but may be employed for any direct current to be measured, and especially very weak direct current where delicate instruments are usually employed for the purpose and which would be subject to damage or burn-out if the current being measured increased beyond a fixed relatively-small amount.

It will also be understood that modifications may be made within the spirit and scope of the appended claims without departure from my invention.

I claim:

1. Apparatus for measuring the positive ion current collected by the grid of a vacuum tube during operation thereof, comprising means causing operation of said tube and negatively biasing said grid, a resistor in the circuit between said grid and said biasing means, a source of direct current, a direct current meter and a three-electrode tube energized from said source, and electrically connected so that at least part of the plate current of said tube passes through said meter, and an electrical connection between the negative end of said resistor and the grid of said three-electrode tube, so that the greater the current in said resistor, the more the grid of said three electrode tube is negatively biased, and the lower the reading of the meter, whereby burnout due to an excess of said positive ion current is impossible.

2. Apparatus for measuring the positive ion current collected by the grid of a vacuum tube during operation thereof, comprising means causing operation of said tube and negatively biasing said grid, an adjustable resistor in the circuit between said grid and said biasing means, a source of regulated direct current, a direct current meter and a three-electrode tube energized from said source, so that at least part of the plate current of said tube passes through said meter, and an electrical connection between the negative end of said resistor and the grid of said three-electrode tube, so that the greater the current in said resistor, the more the grid of said three-electrode tube is negatively biased.

3. Apparatus for measuring the positive ion current collected by the grid of a vacuum tube undergoing test, comprising means causing operation of said tube and negatively biasing said grid, an adjustable resistor in the circuit between said grid and said biasing means, a source of direct current, a bridge circuit across said source, said circuit comprising two three-electrode tubes, each tube being in series with an adjustable resistor to form a leg of the bridge circuit, resistors as the other two legs of the bridge circuit, a direct current meter in series with an adjustable resistor as the bridge between said legs and an adjustable connection between a resistor connected to the grid of one of said three-electrode tubes and the negative end of said adjustable resistor in the circuit between said grid and said biasing means, whereby the grid of said three electrode tube is biased in varying degrees in accordance with the current variation in said circuit between the grid of the tube undergoing test and its biasing means, thereby upsetting the bridge balance and causing the direct current meter to give an indication which may be interpreted to show the strength of the positive ion current collected by the grid of the tube undergoing test.

JOSEPH BUONINCONTRI.

REFERENCES CITED

The following references are of record in the file of this patent:

UNITED STATES PATENTS

| Number | Name | Date |
|---|---|---|
| 1,649,016 | Buckley | Nov. 15, 1927 |
| 1,808,013 | Barnhart | June 2, 1931 |
| 2,033,347 | Manly | Mar. 10, 1936 |
| 2,039,267 | Barber | Apr. 18, 1936 |
| 2,049,306 | Matson | July 28, 1936 |
| 2,122,267 | Wagner | June 28, 1938 |
| 2,356,187 | Swedlow | Aug. 22, 1944 |

OTHER REFERENCES

"Vacuum Tube Voltmeters," by Rider, pages 118, 119, 74, 134, 139, 5, 129 and 130. Published by John F. Rider Publisher Inc., New York 16, N. Y. (1941).